Nov. 22, 1932.   H. D. ALLEN   1,888,206
AIRPLANE COURSE CORRECTOR
Filed Aug. 22, 1929
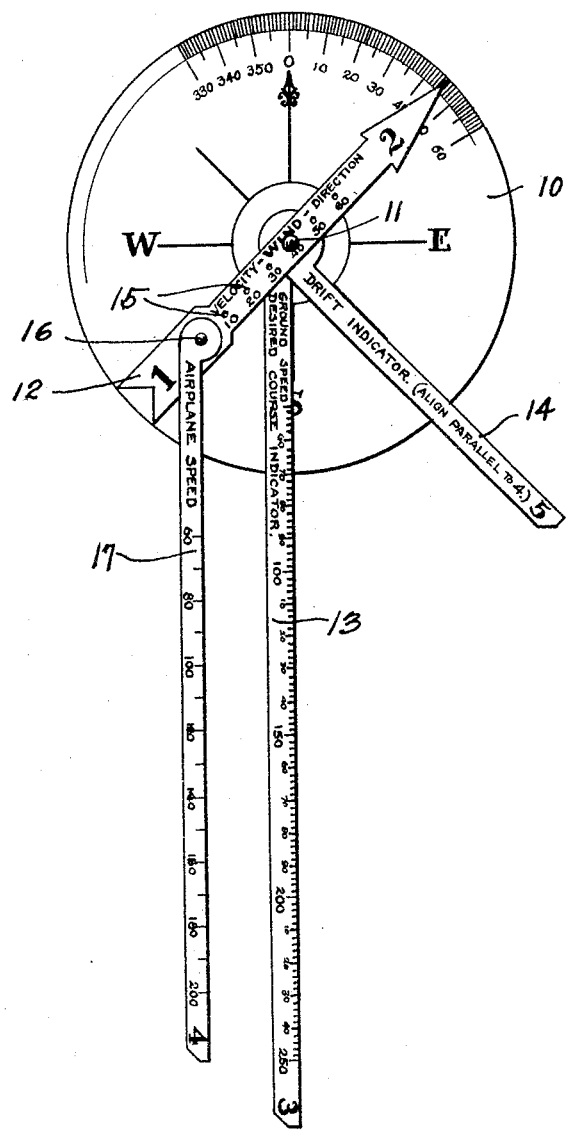
Inventor
Howard D. Allen Patented Nov. 22, 1932

1,888,206

UNITED STATES PATENT OFFICE

HOWARD D. ALLEN, OF LOS ANGELES, CALIFORNIA

AIRPLANE COURSE CORRECTOR

Application filed August 22, 1929. Serial No. 387,638.

This invention relates to an instrument or device primarily designed for use in the study of air navigation, although application of its principles is not restricted to air navigation but may be likewise used in other forms of navigation.

An object of the invention is to provide a device of relatively simple construction which will enable the determining of the proper compass course to follow, making correction for wind or laterally current drift.

An incidental object of the invention is to provide a construction which will enable the determination of the actual speed along the true course when the vehicle is following the compass course with correction made for lateral drift.

With the foregoing and other objects in view, which will be made manifest in the following detailed description, and specifically pointed out in the appended claims, reference is had to the accompanying drawing for an illustrative embodiment of the invention, wherein:

The figure is a plan view of the instrument.

Referring to the accompanying drawing, wherein similar reference characters designate similar parts throughout, the instrument consists of a compass dial 10 which may be printed or otherwise reproduced on any suitable material such as cardboard, celluloid, sheet metal, or the like. Centrally of the compass dial there is provided a removable or detachable pivot 11. This pivot detachably secures to the dial three members designated by the reference characters 12, 13 and 14. The member 12, which will hereinafter be referred to as a wind drift arrow, is preferably made arrow shaped in form. It has small apertures 15 formed therein, each of which are capable of receiving the pivot 11. These apertures are arranged on graduated distances from a stationary pivot 16 which permanently pivots a speed arm 17 to the arrow. Beneath the arrow 12 the members 13 and 14 are arranged with the pivot 11 extending through them and through the center of the compass dial 10. These arms present edges which extend radially from pivot 11. Arm 13, which is a ground speed arm, is graduated upon the same scale as the graduations of the apertures 15. The vehicle speed arm 17 is likewise graduated upon the same scale.

The operation of the improved device is as follows. The direction and velocity of the wind is first determined and if the wind is of a forty mile velocity coming from the northeast the pivot 11 is positioned in the aperture 15 spaced 40 graduations from pivot 16. The pivot is then extended through arms 13 and 14 and into the compass dial 10. The arrow is then positioned similarly to the position assumed by a conventional weather vane, that is the point of the arrow pointing into the wind or into the direction from which the wind is coming. If it is desired to travel due south the ground speed arm 13 is so arranged that its radial edge lies on the 180 degrees graduation on the compass dial. The vehicle speed arm 17 is then swung so as to overlie the ground speed arm 13 without disturbing the positions of the arrow 12 or of the ground speed arm. If the speed of the vehicle is 120 miles per hour, the vehicle speed arm is so positioned that its 120 graduation just overlies the radial edge on the ground speed arm. In the present instance if the vehicle speed arm 17 is so positioned it will be found to cross the ground speed arm 13 at the 142 graduation on the ground speed arm. With the vehicle speed arm 17 thus positioned, the compass course arm 14 is swung to a position exactly parallel. In such position under the example taken the compass course arm 14 will be found to overlie the 167 degree graduation on the compass dial. In other words if the airplane is capable of an air speed of 120 miles per hour, and there is a 40 mile wind from the northeast, and the pilot wishes to follow a true course due south, he must proceed on a 167 degree compass course to compensate for the lateral drift due to the wind. If he follows this compass course of 167 degrees, he will actually travel due south and at a ground speed of 142 miles per hour, which is read on the ground speed arm 13 where it is intersected by the 120 mile graduation on the vehicle speed arm 17.

It will thus be appreciated that the improved instrument enables a compass course to be quickly ascertained which will compensate for lateral drift. Also the instrument gives the actual ground speed developed. If the wind speed or its direction is different from that assumed, the pivot 11 is withdrawn and inserted in the proper aperture 15 to correspond to the wind velocity. Also the arrow 12 is swung about the pivot so as to point in the direction of the wind.

Various changes may be made in the details of construction without departing from the spirit or scope of the invention as defined by the appended claims.

I claim:

1. An instrument for the study of navigation comprising a compass dial, a wind arm, a ground speed arm and a compass course arm pivoted to the center of the compass dial, a vehicle speed arm pivoted to the wind arm, said wind arm being capable of being adjusted with respect to the center of the compass dial in accordance with various wind velocities.

2. An instrument for the study of navigation comprising a compass dial, a wind arm, a ground speed arm and a compass course arm pivoted to the center of the compass dial, a vehicle speed arm pivoted to the wind arm, the pivot for the wind arm, compass course arm and ground speed arm being removable to enable the wind arm to have its position adjusted with respect to the compass dial in accordance with various wind velocities.

HOWARD D. ALLEN.